(12) United States Patent
Peloquin et al.

(10) Patent No.: US 7,036,126 B2
(45) Date of Patent: Apr. 25, 2006

(54) METHOD AND AN APPARATUS FOR LOGICAL VOLUME MANAGER PLUG-INS

(75) Inventors: Mark A. Peloquin, Austin, TX (US); Benedict Michael Rafanello, Round Rock, TX (US); Cuong Huu Tran, Austin, TX (US); Cristi Nesbitt Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 09/734,812

(22) Filed: Dec. 11, 2000

(65) Prior Publication Data

US 2002/0073242 A1   Jun. 13, 2002

(51) Int. Cl.
*G06F 15/163* (2006.01)

(52) U.S. Cl. ...................... 719/310; 711/202
(58) Field of Classification Search .......... 711/111, 711/4, 100, 202; 709/321; 719/310
See application file for complete search history.

(56) References Cited

U.S. PATENT DOCUMENTS

| | | | | |
|---|---|---|---|---|
| 5,129,088 A | | 7/1992 | Auslander et al. ........... 395/700 |
| 5,784,703 A | | 7/1998 | Muraoka et al. ............. 711/173 |
| 5,787,019 A | * | 7/1998 | Knight et al. ................ 719/324 |
| 5,829,053 A | * | 10/1998 | Smith et al. ................. 711/202 |
| 5,915,131 A | * | 6/1999 | Knight et al. ................ 710/72 |
| 5,933,646 A | * | 8/1999 | Hendrickson et al. ....... 717/169 |
| 5,940,849 A | | 8/1999 | Koyama ........................ 711/4 |
| 5,968,184 A | * | 10/1999 | Kedem ........................... 714/7 |
| 5,983,316 A | | 11/1999 | Norwood ..................... 711/112 |
| 6,112,276 A | * | 8/2000 | Hunt et al. .................. 711/112 |
| 6,122,685 A | | 9/2000 | Bachmat ....................... 710/74 |
| 6,145,067 A | | 11/2000 | Kuwata ....................... 711/165 |
| 6,167,449 A | * | 12/2000 | Arnold et al. ............... 709/227 |
| 6,370,626 B1 | | 4/2002 | Gagne et al. ............... 711/154 |
| 6,405,366 B1 | * | 6/2002 | Lorenz et al. .............. 717/107 |
| 6,523,047 B1 | * | 2/2003 | Rafanello et al. ........... 707/200 |
| 6,651,084 B1 | * | 11/2003 | Kelley et al. ............... 709/202 |
| 6,742,176 B1 | * | 5/2004 | Million et al. ............... 717/120 |

OTHER PUBLICATIONS

Ben Rafanello, A fully integrated logical volume management system, May 2000.*

* cited by examiner

*Primary Examiner*—Meng-Al T. An
*Assistant Examiner*—LeChi Truong
(74) *Attorney, Agent, or Firm*—Duke W. Yee; David A. Mims, Jr.; Betty Formby

(57) ABSTRACT

A mechanism is provided by which a logical volume manager may allow features to be added and modified without having to modify the logical volume manager code. The present invention provides an logical volume manager engine, which attempts to load feature plug-ins that are stored as dynamic link libraries. The logical volume manager also includes application program interfaces to make it possible for user interfaces and other programs that communicate with the LVM Engine to communicate with features created by third parties. The logical volume manager is also modified to eliminate assumptions about the number and order of features being applied to the volume. Features may be selected and ordered by a user at the time of volume creation.

4 Claims, 4 Drawing Sheets

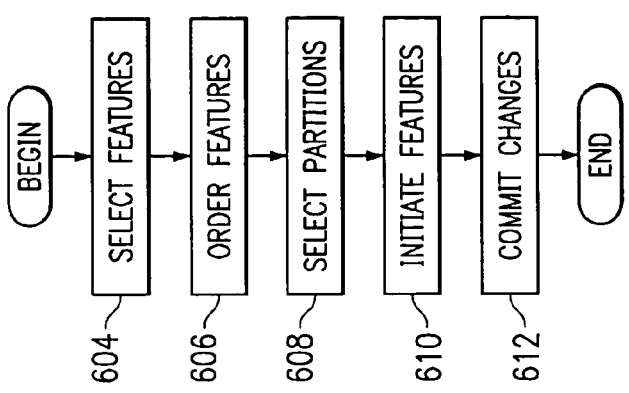
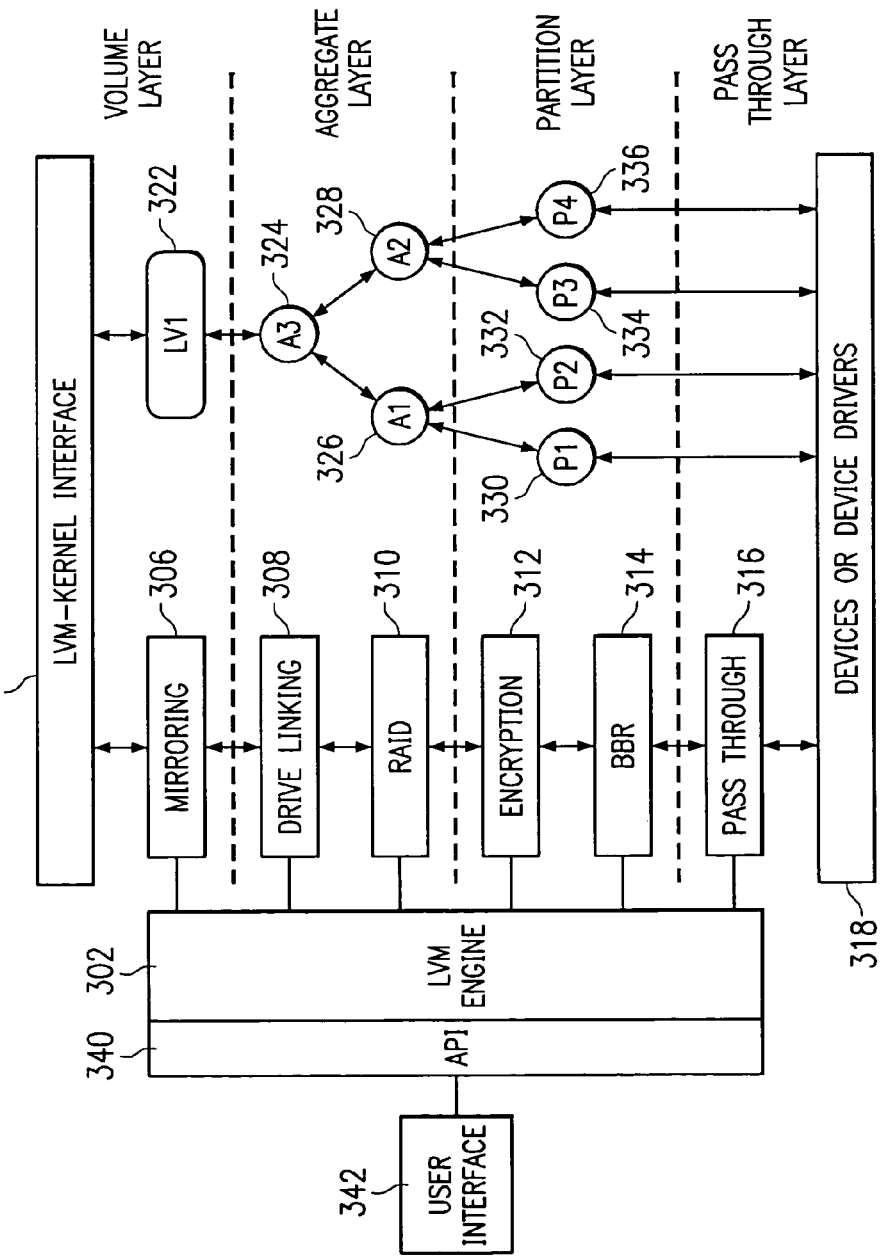

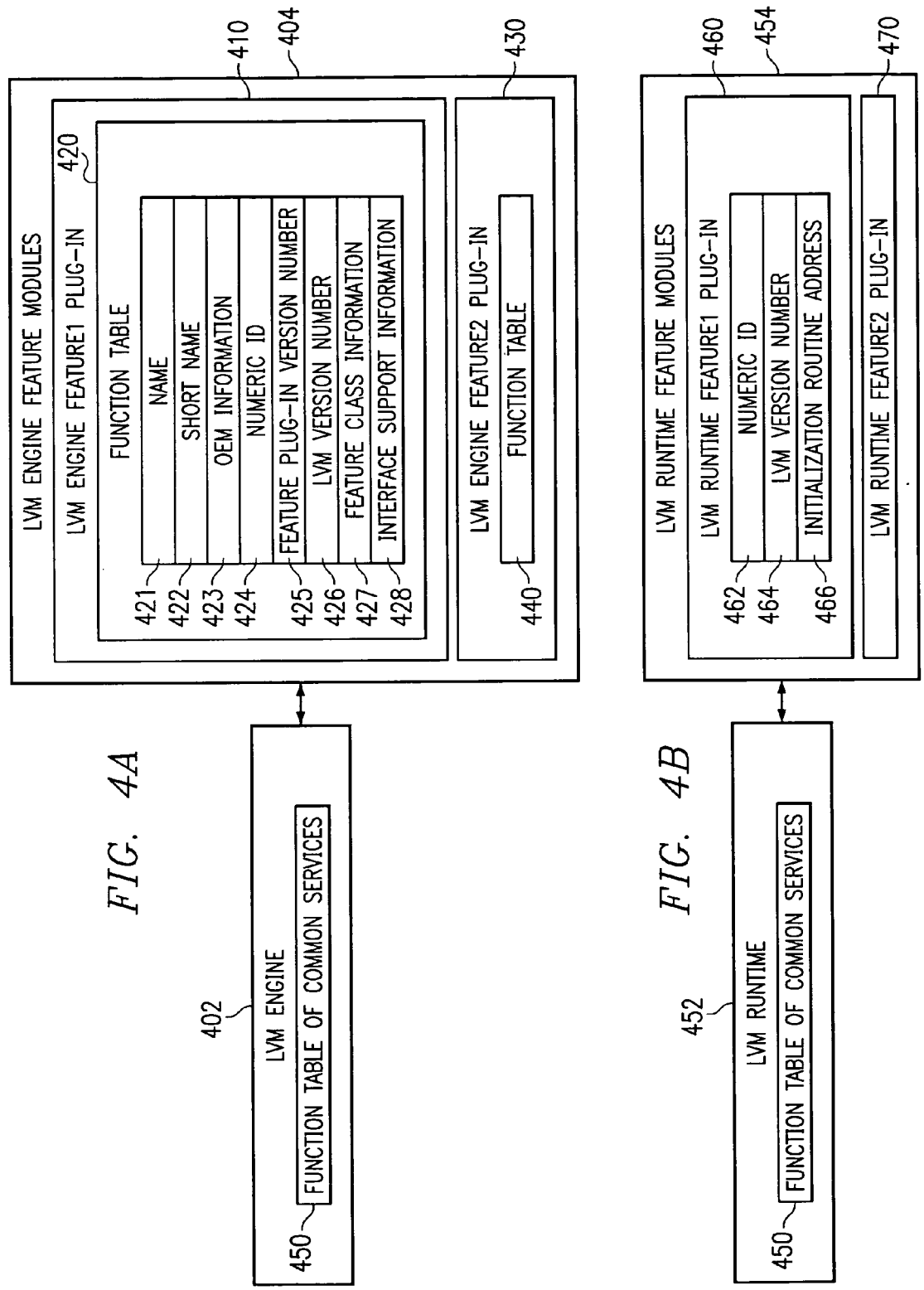

METHOD AND AN APPARATUS FOR LOGICAL VOLUME MANAGER PLUG-INS

RELATED APPLICATIONS

The present application is related to commonly assigned and U.S. patent application Ser. No. 09/697,579 entitled "A METHOD AND AN APPARATUS FOR DYNAMIC COMMAND LINE PARSING IN THE PRESENCE OF MULTIPLE PLUG-IN COMPONENTS" now abandoned, Ser. No. 09/697,449 entitled "A METHOD AND AN APPARATUS TO DYNAMICALLY ORDER FEATURES AND TO RESOLVE CONFLICTS IN A MULTIPLE-LAYER LOGICAL VOLUME MANAGEMENT ENVIRONMENT", and Ser. No. 09/697,450 entitled "A METHOD AND AN APPARATUS FOR VOLUME CREATION IN THE PRESENCE OF MULTIPLE AGGREGATORS", filed on Oct. 26, 2000, and Ser. No. 09/734,811 entitled "A METHOD AND AN APPARATUS TO EXTEND THE LOGIC VOLUME MANAGER MODEL TO ALLOW DEVICE MANAGEMENT PLUG-INS", filed on an even date herewith, are hereby incorporated by reference.

BACKGROUND OF THE INVENTION

1. Technical Field

The present invention relates generally to an improved method to manage logical volumes and, in particular, to a method and an apparatus for providing a plug-ins in a logical volume management system. Still more particularly, the present invention provides a mechanism to allow Independent Software Vendors (ISVs) to write binary plug-in modules to expand the capabilities of a logical volume manager.

2. Description of the Related Art

The Logical Volume Manager (LVM) is a subsystem for on-line disk storage management that adds an additional layer between the physical devices and the block I/O interface in the kernel of the operating system to allow a logical view on storage. For systems without an LVM, each of the partitions that is usable by the operating system is assigned a drive letter, such as "C:" or "F:", producing a correlating drive letter for each partition on a disk in the computer system. The process which assigns these letters is commonly known.

For systems with an LVM, a drive letter may be mapped instead to a logical volume which may contain one or more partitions. The process by which partitions are combined into a single entity is known generically as "aggregation."

There are various forms of aggregation, such as Drive Linking and software Redundant Array of Independent Disks (RAID). Each feature, i.e. a function that may be performed on a partition, aggregate or volume, offered by the LVM for use on a volume is a layer in the LVM. The input to a layer has the same form and structure as the output from a layer. The layers being used on a volume form a stack, and I/O requests are processed from the top most layer down the stack to the bottom most layer. Typically, the bottom most layer is a special layer called the Pass Through layer.

U.S. patent application Ser. No. 09/561,184 (now abandoned), which is hereby incorporated by reference, discloses a multi-layer logical volume management system for an LVM in the OS/2 operating system. Similar systems can be extended to handle multiple levels of aggregation in other operating systems.

Prior art LVMs use a layered model in which each feature that can be applied to a partition is a layer in the model. Each layer accepts the same inputs and outputs and the output of one layer may be used as the input to another layer. Thus, the features in use on a volume for a stack. Operations performed on the volume start at the top of the stack and progress down through each layer until either the operation has been completed or it is passed on to an operating system component below the LVM. This model is static and requires that the source code to LVM be modified in order for LVM to be extended in any fashion.

Therefore, it would be advantageous to have a method and an apparatus to enhance the logical volume management model to allow third parties to create modules that the LVM will recognize to extend its capabilities.

SUMMARY OF THE INVENTION

The present invention provides a logical volume manager, which uses a layered model in which each feature that can be applied to a partition is a layer in the model. Features may be added without modifying the source code. The logical volume manager includes application program interfaces for allowing third parties to create features, which the logical volume manager can find, load, and use. The logical volume manager is modified to eliminate assumptions about the number and order of features being applied to a volume, as well as being modified to actively seek plug-in components.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram of a logical volume manager in accordance with a preferred embodiment of the present invention;

FIGS. 4A and 4B are block diagrams of an LVM loading feature plug-ins in accordance with a preferred embodiment of the present invention;

FIG. 6 is a flowchart illustrates the operation of creating a new volume in accordance with a preferred embodiment of the present invention.

DETAILED DESCRIPTION OF THE PREFERRED EMBODIMENT

Figure 1:
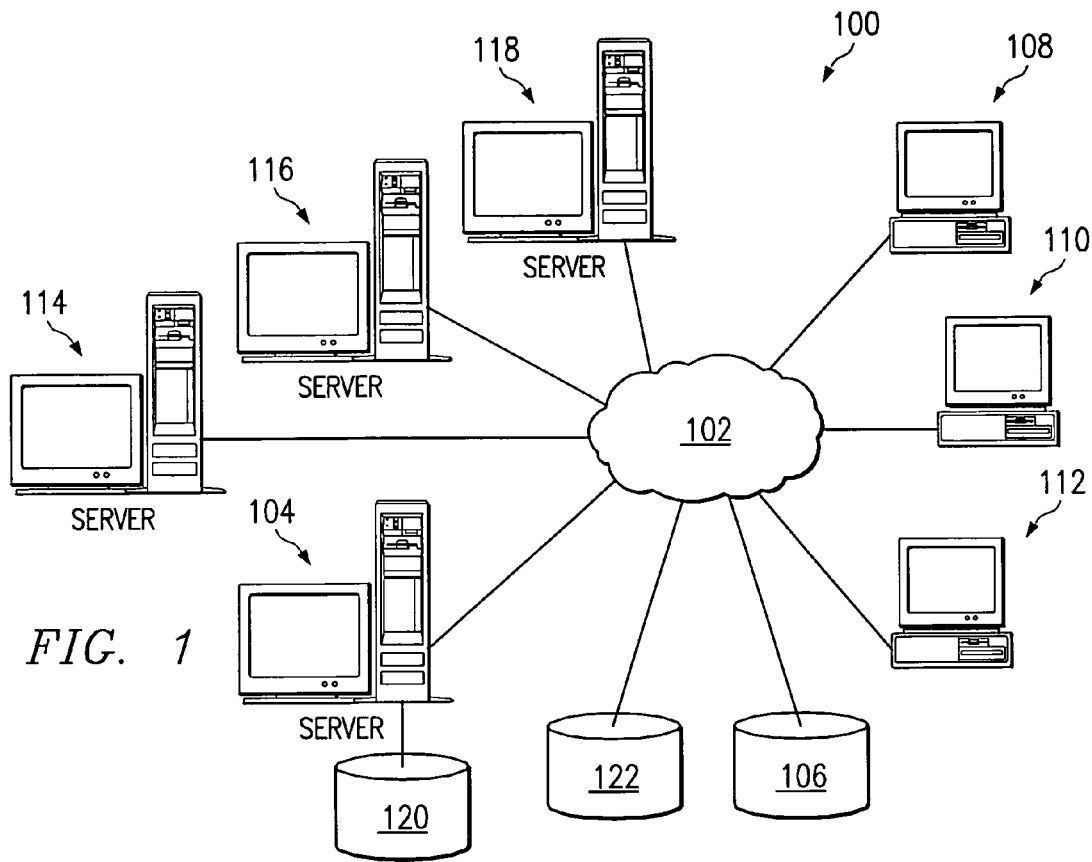
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, servers 104, 114, 116 and 118 are connected to network 102. Storage units 106 and 122 are also connected to network 102, providing backup support for any or all of servers 104, 114, 116 and 118. Storage unit 122 provides dedicated backup support for server 104. In addition, clients 108, 110, and 112 are also connected to network 102. These three clients may be, for example, personal computers or network computers. For purposes of this application, a network computer is any computer coupled to a network, which receives a program or other application from another computer coupled to the network. Distributed data processing system 100 may include additional servers, clients, and other devices not shown.

In the depicted example, servers 104, 114, 116 and 118 provide storage for data from clients 108, 110 and 112. These four servers also provide data, such as boot files, operating system images, and applications to clients 108, 110 and 112. Clients 108, 110 and 112 are clients to one or all of servers 104, 114, 116 and 118. Support for a particular application being performed on one of clients 108, 110 and 112 may be by one of servers 104, 114, 116 and 118. Additionally servers 104, 114, 116 and 118 may provide backup support for each other. In the event of a server failure, a redundant backup server may be allocated by the network administrator, in which case requests directed to the failed server are routed to the redundant backup server.

In a similar manner, data backup support is provided by storage units 106 and 122 for servers 104, 114, 116 and 118. However, rather than the network administrator allocating a data backup storage unit at each use, data backup allocation is set, and data backup transfer occurs at low usage times, typically after midnight, between any of servers 104, 114, 116 and 118 and storage units 106 and 122.

In the depicted example, distributed data processing system 100 may be the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network. FIG. 1 is intended as an example and not as an architectural limitation for the processes of the present invention.

Figure 2:
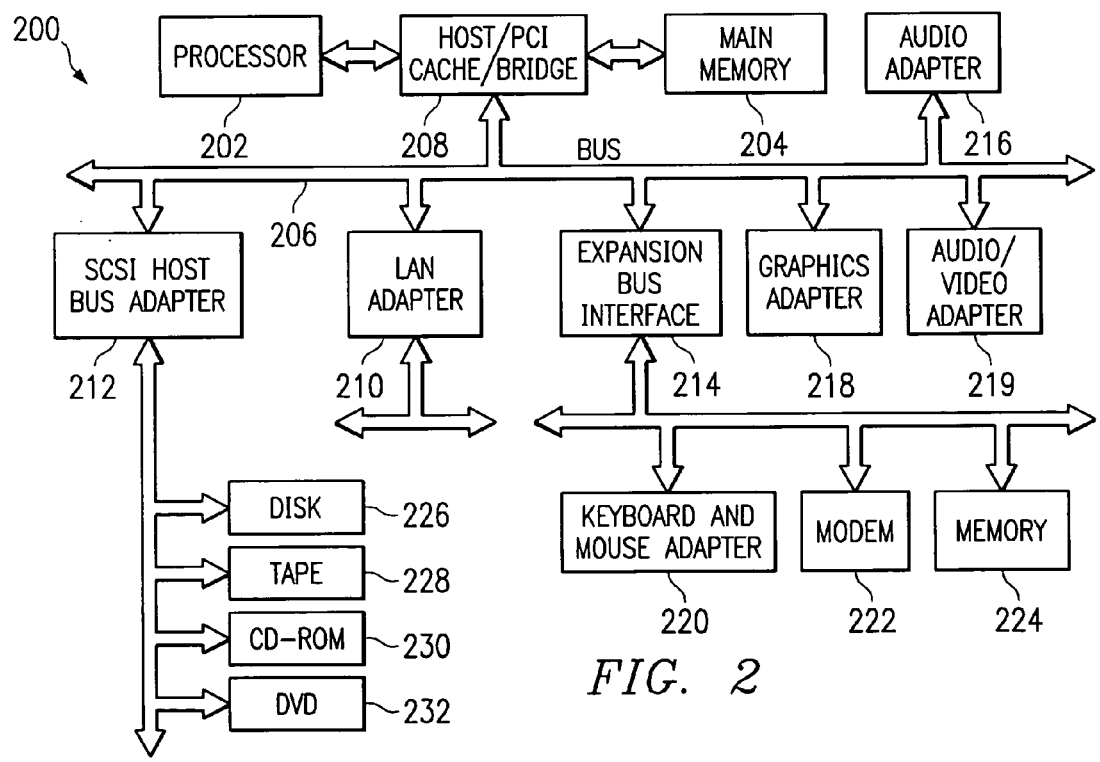
FIG. 2 is a block diagram of a data processing system that may be implemented as a server or a client in which the present invention may be implemented.

With reference now to FIG. 2, a block diagram of a data processing system in which the present invention may be implemented is illustrated. Data processing system 200 is an example of a client computer. Data processing system 200 employs a peripheral component interconnect (PCI) local bus architecture. Although the depicted example employs a PCI bus, other bus architectures, such as Micro Channel and ISA, may be used.

Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots.

Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as OS/2, which is available from International Business Machines Corporation. "OS/2" is a trademark of International Business Machines Corporation.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

The invention is preferably realized using a well-known computing platform, such as an IBM personal computer, running the IBM OS/2 operating system. However, it may be realized in other popular computer system platforms, such as a Sun Microsystems workstation or IBM RS/6000 workstation, running alternate operating systems such as Microsoft Windows, HP-UX, UNIX or LINUX, without departing from the spirit and scope of the invention.

The present invention provides a mechanism by which features of a logical volume manager (LVM) are dynamically ordered and conflicts between features in a multiple-layer logical volume management environment are resolved. The logical volume manager (LVM) may be implemented in a a data processing device, such as data processing device 200 in FIG. 2, or the like. The present invention provides an LVM with a plug-in mechanism, which allows features to be dynamically added, removed, and modified. The LVM otherwise operates in the same manner as prior art LVMs including the same features and performance.

LVM was designed using a layered model. Each layer in the model implements a specific function. For example, the Drive Linking layer, which is implemented as a feature plug-in, links partitions from one or more hard drives to form a single volume. The layered model allows extensibility. New feature plug-ins may be added to enhance the capabilities of the LVM. The data required to implement these features is stored inside of the partitions that comprise the LVM Volume. Specifically, the last sector of each partition that is part of an LVM Volume contains an LVM Signature Sector. The LVM Signature Sector indicates which features are active on the volume of which the partition is a part, and where on the partition the data for those features may be found.

With reference now to FIG. 3, a block diagram of a logical volume manager is shown in accordance with a preferred embodiment of the present invention. The LVM engine 302 loads feature plug-ins to form a "feature stack". A "feature stack" is a model of the features that are applied to partitions/aggregates at various layers. The feature stack corresponds to a "tree" model of a multi-layer logical volume. The feature stack is a hierarchical stack of plug-in features ordered based on their classifications. The lowest level feature is a pass through feature. The next lowest level features are the partition level plug-ins, the middle level features are the aggregate level plug-ins, and the top level features are the volume level features.

All layers in the model assume that there is a layer below them, except for the pass through layer. The pass through layer is always the bottom layer. Its purpose is to end the downward passing of requests, and to perform some universal actions. Having the pass through layer as the designated bottom layer allows all other layers to be written with the assumption that there is always another layer below them. This helps each of the other layers to be independent of each other, which makes it easier to add layers later on.

Items 306–316 form the "feature stack". While there is no particular limit on the number of features which may appear in the "feature stack", for simplicity, the example shown in FIG. 3 employs only six features. In the particular "feature stack" shown in FIG. 3, a "Pass Through" feature 316 is at the bottom which interfaces to the disk devices or device drivers 318. Above the "Pass Through" feature 316 is the Bad Block Relocation (BBR) feature 314. Above this feature is the Encryption feature 312. Above the Encryption feature is the software RAID 310 and Drive Linking 308 features. At the top of the feature stack is Remote Mirroring 306. From the view of the feature stack model, an I/O request is received from the LVM-kernel interface 304 at the top of the stack and propagated downwards to the "Pass Through" feature.

The corresponding tree model is shown to the right of the feature stack model. Logical volume LV1 322 is at the root of the tree. The child of LV1 is the aggregate A3 324, which is created by the Drive Linking feature. The Drive Linking feature creates A3 324 from aggregates A2 326 and A1 328, which appear in the tree model as the children of A3. Aggregates A1 326 and A2 328 are created by the Software RAID feature, and the partitions from which they are made of appear in the tree model as their children. Thus, the software RAID feature creates aggregate A1 326 from partitions P1 330 and P2 332, and creates aggregate A2 328 from partitions P3 334 and P4 336.

An aggregator can group either multiple partitions, as is the case for A1 and A2, or multiple aggregates, as is the case for A3, or any combinations of partitions and aggregators needed by the aggregating feature. Allowing multiple features in the feature stack to create aggregates can help overcome some system limitations. For example, many RAID systems limit the number of partitions that may be used in an aggregate. However by allowing disk linking of RAID aggregates, as shown in FIG. 3, this software limitation can effectively be overcome.

It should be noted that the tree model consists of nodes that represent views or mapping of physical storage. Nodes can be physical partitions or aggregators. Since aggregators combine one or more storage nodes into a single resulting node, the resulting node represents a different view or mapping of the original storage nodes. Thus, the tree model will only depict nodes for partitions and features which produce aggregates. Other features which appear in the feature stack model do not have corresponding nodes in the tree model because they operate on the data contained within the node, rather than the view or representation of the underlying storage.

Thus, Remote Mirroring 306, for example, affects the processing of an I/O request as the I/O request proceeds from LV1 322 to A3 324 in the tree model of the volume. Similarly, Encryption and BBR affect the processing of I/O requests as they proceed from A1 326 to P1 330 and P2 332, or A2 328 to P3 334 and P4 336. These types of LVM structures, feature stack models, and tree models are well understood in the art, and the models can be equally well applied to logical volume management systems in other operating systems such as Hewlett Packard's HP-UX and IBM's AIX.

The LVM of the present invention allows multiple aggregators to be present in the system. For example, as shown in FIG. 3, two aggregators, RAID 310 and Drive Linking 308, may be used to combine partitions and aggregates into other aggregates. Since the user can choose which features to use on a volume when the volume is being created, every volume in the system can have a different set of features being used on it as well as different levels of aggregation. This makes volume discovery, i.e. the process by which the LVM creates all of the volumes in the system after boot, difficult.

The LVM Engine 302 has a set of application program interfaces (API) 340 for use by the LVM interfaces, such as user interface 342, and any other programs that need LVM support. The user interface may be a graphical user interface (GUI) or a command line interface. The APIs use handles to represent volumes, drives, and partitions, and do not allow direct access to the LVM engine's internal structures.

When performing the volume discovery process, the LVM examines all of the partitions in a system. Each partition which is part of an LVM volume has LVM data associated with it. The LVM data identifies which volume the partition belongs to and which LVM features are used on that partition. Once the LVM has determined which partitions are part of which volumes, the LVM groups them according to volume. At this point, the LVM knows how many volumes it is trying to create. The LVM then starts with the first potential volume and processes all of the partitions belonging to that volume until it determines whether or not it can successfully create the volume. The LVM then repeats this process until all of the potential volumes have either been created or discarded.

If multiple levels of aggregation are used on a volume, the processing of partitions for the volume may become extremely complicated. Each partition/aggregate has LVM data associated with it which indicates to the LVM which features (plug-ins) are to be applied to this partition/aggregate. However, if a partition is part of an aggregate, the partition's LVM data does not indicate what features are applied to the aggregate. This information is stored in the aggregate's LVM data and is not accessible until the aggregate is created.

Furthermore, an aggregator may combine aggregates and/or partitions in any combination. This means that when the LVM examines the LVM data associated with a partition, the data may indicate that the partition belongs to an aggregate but this aggregate may also contain other aggregates which must be created first. Moreover, each partition belonging to a specific aggregate may have different LVM features applied to it before it becomes a member of the aggregate. Thus, there are many combinations of features, partitions, and aggregates that may result.

LVM consists of two major components: the LVM Engine and the LVM Runtime. The LVM Engine is responsible for the creation of partitions and LVM volumes. This process includes the selection and configuration of features to be applied to selected partitions to form LVM volumes. The LVM Engine populates the LVM Data Area with the data required to completely construct or reconstruct a working LVM volume. The LVM Runtime reads the information in the LVM Data Area to reconstruct a working LVM volume usable by the hosting operating system. The LVM Runtime is also responsible for handling all input/output (I/O) requests from the host operating system to LVM volumes. So the LVM Engine creates, verifies, and stores the configuration information needed by the LVM Runtime to correctly reassemble or construct a working LVM volume usable by the host operating system.

Each feature has two plug-in modules. One module is used by the LVM Engine to create, configure, and store the LVM feature information in the LVM Data Area. The second module is used by the LVM Runtime to read the LVM feature data stored in the LVM Data Area(s), by the LVM Engine, of the appropriate partition(s) or aggregate(s) to properly apply and activate that feature during the construction or reconstruction of the resulting LVM volume.

Creating a new volume is very similar to discovering an existing volume. When the LVM engine Create Volume API is used, the caller must provide a list of the partitions that are to be part of the volume. The caller must also provide a list of the features to apply to the volume. This list of features is what the LVM Engine uses to decide what features to pass the list of partitions to.

The LVM engine first processes the list of partitions. For each partition in the list, it creates and attaches LVM Signature Sector. Once this has been completed, it passes the list of partitions to the Pass Through layer. The pass through layer creates and attaches a context record to each partition in the list. It does not, however, add itself to the feature table in the LVM Signature Sector. If it completes this process for every partition in the list, it returns success. If it cannot complete this process for every partition in the list, it undoes any changes it has made and then returns an error.

Next, the LVM engine passes the list of partitions to BBR. BBR is added to each LVM volume by default. Now that BBR and Pass Through are established on the partitions in the new volume, the LVM engine begins passing the list of partitions to each feature specified in the list of features provided by the user. Each feature performs the following steps:

Add itself to the feature table of the LVM Signature Sector of each partition. The first available entry in the feature table of each LVM Signature Sector is used.

Allocate space, if needed, in the LVM Data Area of each partition.

Create and attach a context record to each partition.

If these steps cannot be completed for each partition in the list, then the feature must undo any changes it has made to the partitions in the list and then notify any features already attached to the partitions that the volume creation is being aborted.

While the above steps cover most features, aggregators must perform an additional step. Aggregates look, to the rest of the system, just like partitions. The size of an aggregate is approximately equal to the size of the partitions that it represents. Aggregates also have an LVM Signature Sector. Thus, when Drive Linking creates an aggregate, it must also create an LVM Signature Sector for it. This allows any features which follow Drive Linking to be able to attach themselves to the aggregate. This LVM Signature Sector and its associated LVM Data Area will be written to the last partition in the aggregate and will be used during the volume discovery process to reconstruct volumes employing Drive Linking.

When the LVM Engine completes calling all of the features specified by the user, it expects to see a single partition remaining in the list of partitions. This may be a real partition or it may be an aggregate. If this condition is met, the LVM Engine creates a volume object and associates the remaining entry in the list of partitions with it. If this condition is not met, the LVM Engine aborts the volume creation process and uses the context records associated with the remaining items in the list to notify the features that the volume creation process is being aborted.

Volume deletion is a rather straight forward process. When the LVM Engine Delete Volume API is called, the LVM Engine locates the volume object specified and removes it from the LVM Engine's list of volumes. It then examines the partition/aggregate associated with the volume, after which it deletes the volume object. If the volume is an LVM volume, then the LVM Engine examines the first context record associated with the partition/aggregate and calls the delete function specified. This activates the delete routine associated with the last feature added to the partition/aggregate. This feature removes itself from the partition/aggregate and then calls the delete function associated with the next context record associated with the partition/aggregate. If the feature is an aggregator, it calls the delete function specified by the context record of each partition in the aggregate. Thus, the delete command propagates down through the features associated with the volume until it reaches the Pass Through layer, where the partitions associated with the volumes are actually deleted.

In order for the LVM Engine to access a plug-in, it needs to know about the plug-in. The present invention uses a dynamic approach to solve this problem. According to a preferred embodiment of the present invention, the plug-in component which interfaces with the LVM Engine is a dynamic link library (DLL), and that DLL resides in a special LVM directory. All DLLs residing in this directory are assumed to be LVM plug-in modules, and the LVM Engine attempts to load and use all of the DLLs in this special directory.

Each DLL representing an LVM plug-in module exports two entry points. The first entry point provides the LVM Engine with information about which version of LVM the plug-in is written to work with. If the LVM Engine determines that it can not work with the plug-in, then the DLL is closed and removed from memory. If the plug-in can be used, the second entry point is called. This entry point allows the LVM Engine to provide the address of a function table of common services to the plug-in, and the plug-in to return the address of the functions that the LVM Engine needs to be able to correctly use the plug-in.

When the LVM Engine has completed its installation and configuration of an LVM volume, it sends a signal to the LVM Runtime driver. This signal, usually an I/O control (IOCTL) signal, tells the LVM Runtime that a new or changed LVM volume is available. It is then the responsibility of the LVM Runtime to examine the hard disks in the system to locate the new or changed pieces of the new or changed LVM volume. A list of new or changed partitions is created in the LVM Runtime's Pass Through Layer. The Pass Through Layer examines the LVM Data Area to find the list of features applied to each partition. Each feature specified in the LVM Data Area is, in turn, passes the list of partitions and/or aggregates. The features determine if all the requirements are present in order to completely apply the feature. If any requirement is not meet, the LVM volume is not created and not made available to the host operating system. Once all the partitions and/or aggregates have successfully had all their features applied, the resulting LVM volume is made available for use by the host operating system.

As an LVM volume is being reconstructed by the LVM Runtime, an in-memory representation of the "tree model" in FIG. 3 is created. The "tree model" is required to allow the LVM Runtime to work properly.

Once the LVM volume is available to the host operating system, the LVM Runtime can then accept I/O requests on behalf of the operating system and direct them to the LVM volume. The I/O requests flows down through the LVM volume's feature stack and are eventually sent to the partition containing the data area being targeted by the I/O request.

During an LVM delete volume request, the LVM Engine sends another signal to the LVM Runtime. This signal is usually an IOCTL. This signal tells the LVM Runtime to purge its in-memory "tree model" and free the storage containing the tree model. Once that is done, the LVM Engine continues its volume deletion responsibilities.

With reference to FIGS. 4A and 4B, block diagrams of an LVM Engine loading feature plug-ins are shown in accordance with a preferred embodiment of the present invention. Particularly, with respect to FIG. 4A, LVM Engine 402 attempts to load feature plug-ins from LVM Engine Feature Modules 404. LVM Engine Feature Modules 404 include LVM Engine Feature1 plug-in 410 and LVM Engine Feature2 plug-in 430. LVM Engine Feature1 plug-in includes function table 420 and Feature2 plug-in includes function table 440.

LVM Engine Feature1 plug-in 410 exports an entry point to LVM Engine 402 to indicate the LVM version it is designed to work with. If the LVM Engine can work with the plug-in, a second entry point is called and the LVM Engine communicates a function table of common services 450 to LVM Engine Feature1 plug-in 410. In response, LVM Engine Feature1 plug-in communicates function table 420 to the LVM Engine. The function table passed into a plug-in by the LVM Engine defines which LVM Engine internal structures are accessible to a plug-in, as well as the functions required to manipulate these structures. Memory allocation and deallocation functions are provided. It is important that a plug-in use these functions to allocate and deallocate memory.

The information provided by function table 420 is for use by the LVM Engine and its associated interfaces. The information provided includes the following:

Name 421—The name of the feature plug-in. This is used by the LVM user interface whenever it needs to refer to the feature plug-in.

Short Name 422—The short name is an abbreviation for the plug-in. It must be unique among plug-in short names as it is used by an LVM Command Line Interface when parsing command lines.

OEM Information 423—This field allows the independent software vendor (ISV) who created a feature plug-in to store copyright information. This field may be displayed by one or more of the interfaces which use the LVM Engine.

A numeric ID 424—This ID must be unique among feature plug-ins. The numeric ID is actually stored in the LVM Signature Sector for a feature, and it is used internally by the LVM Engine to specify a feature.

Feature Plug-in Version Number 425—The version number of the plug-in.

LVM Version Number 426—This is the version number of LVM that the feature plug-in is designed to work with. The LVM Engine uses this to determine whether or not it can make use of a feature plug-in.

Feature Class Information 427—The feature class information tells the LVM Engine which classes a feature belongs to, and which class is the preferred class for a feature. The LVM class system for plug-ins is described below.

Interface Support Information 428—Since each feature plug-in can have up to four user interface panels that it provides, the LVM Engine needs to know how many user interface panels a plug-in provides and which functions to call for these user interface panels for each user interface type. The interface support information provides this information to the LVM Engine.

The features used by the LVM Runtime are also plug-in modules. These modules are stored in a unique LVM directory. As a feature is required by an LVM volume being constructed, the LVM Runtime will find and load that feature. When the feature loads, it reports two entry points. One entry point allows the LVM Runtime to export a list of common services for use by the feature. The second entry point is the address of the feature's initialization routine which is used by the LVM Runtime during volume construction process.

Turning now to FIG. 4B, LVM Runtime 452 attempts to load feature plug-ins from LVM Runtime Feature Modules 454. LVM Runtime Feature Modules 454 include LVM Runtime Feature1 plug-in 460 and LVM Runtime Feature2 plug-in 470. LVM Runtime Feature1 plug-in includes data structures including Numeric ID 462, LVM Version Number 464, and an Initialization Routine Address 466. LVM Runtime Feature2 plug-in includes similar data structures.

The LVM user interfaces must know about potential interactions between feature plug-ins so that it can prevent a user from selecting feature plug-ins that do not work together. Furthermore, if the user selects multiple feature plug-ins for a volume, the LVM user interfaces must determine which orderings of those plug-ins will work, and which ordering of those plug-ins is the most desirable. To do this, LVM defines three classes for plug-ins: Partition, Volume, and Aggregate. Feature plug-ins in the partition class are those which operate on partitions, not aggregates. BBR is a partition class feature. Aggregate class members are aggregators, i.e. they produce aggregates. Drive Linking is a member of the aggregate class. Volume class members are those which operate on aggregates. A volume mirroring feature plug-in is a member of the volume class. While most plug-ins belong to only one class, it is possible for a plug-in to belong to multiple classes. An encryption plug-in could belong to both the volume and partition classes, for example.

While the establishment of classes helps solve some ordering problems, it does not solve all potential ordering conflicts since there can be multiple features in a class. To handle multiple features within a class, each feature plug-in has a set of attributes associated with it for each class it belongs to. These attributes are used to solve ordering problems within a class, or to allow a plug-in to be exclusive in some way. The attributes are as follows:

Global Exclusive—This attribute, if set, indicates that the associated feature plug-in must be the only feature plug-in in use on this volume (besides BBR, which is always present on an LVM volume).

Top Exclusive—This attribute, if set, indicates that this feature plug-in must be the first feature plug-in in this class that gets to examine and process an I/O request against the volume.

Bottom Exclusive—This attribute, if set, indicates that this feature plug-in must be the last feature plug-in in this class that gets to examine and process an I/O request against the volume.

Class Exclusive—This attribute, if set, indicates that this feature plug-in must be the only feature plug-in in this class which is used on the volume.

Weight Factor—If none of the preceding attributes are set, then the weight indicates a relative ordering for the feature plug-in. Weights may be in the range of 1 to 100. The higher the weight, the earlier a feature plug-in will get a chance to examine and process an I/O request against the volume.

Figure 5A:
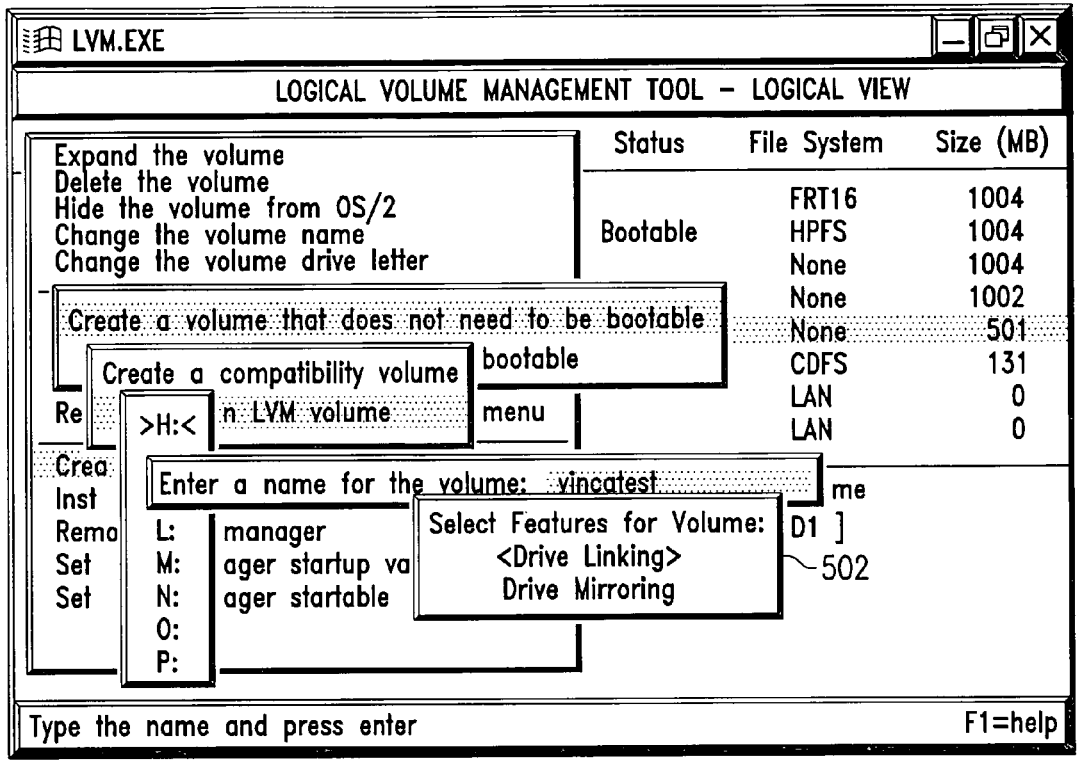
FIGS. 5A and 5B are example screens of display with which a user selects and orders features during volume creation in accordance with a preferred embodiment of the present invention.
Figure 5B:
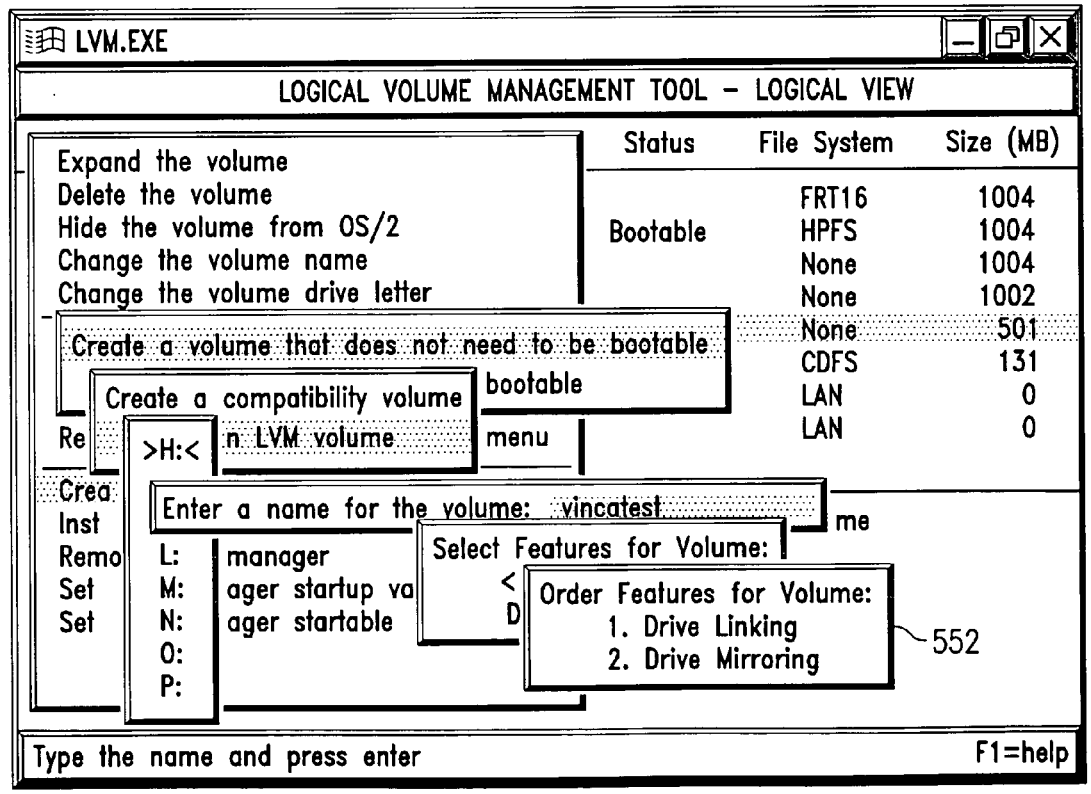

With reference now to FIGS. 5A and 5B, example screens of display are shown with which a user selects and orders features during volume creation in accordance with a preferred embodiment of the present invention. Particularly, with respect to FIG. 5A, logical volume management tool window 500 includes dialog box 502, which prompts the user to select features for the volume being created.

Turning to FIG. 5B, logical volume management tool window 550 includes dialog box 552, which prompts the user to order features that were previously selected for the volume. Ordering of the features may not be necessary, depending on the attribute information associated with the features.

With reference now to FIG. 6, a flowchart illustrates the operation of creating a new volume in accordance with a preferred embodiment of the present invention. The process begins, selects features for the volume (step 604), and orders the features (step 606). The features may be selected and ordered by the user, as discussed above. Next, the process selects partitions (step 608) and initiates the features (step 610). The process then commits the changes (step 612) and ends.

Thus, the present invention provides a mechanism by which an LVM may allow features to be added and modified without having to modify the LVM code. The present invention provides an LVM Engine, which attempts to load feature plug-ins that are stored as dynamic link libraries. The LVM also includes application program interfaces to make it possible for user interfaces and other programs that communicate with the LVM Engine to communicate with features created by third parties. The LVM is also modified to eliminate assumptions about the number and order of features being applied to the volume. Features may be selected and ordered by a user at the time of volume creation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed:

1. A computer implemented method for providing features in a logical volume management system, comprising:
    loading a set of feature plug-in modules;
    selecting a first plurality of feature plug-in modules from the set of feature plug-in modules;
    ordering the first plurality of feature plug-in modules, comprising:
        receiving classification information corresponding to the first plurality of feature plug-in modules, the classification information indicating a class for each feature plug-in module in the first plurality of feature plug-in modules, wherein the class for each feature plug-in module in the first plurality of feature plug-in modules comprises one of partition, volume, and aggregate; and
        ordering the first plurality of feature plug-in modules based on the classification information; and
    applying the first plurality of feature plug-in modules to a first volume.

2. A computer implemented method for providing features in a logical volume management system, comprising:
    loading a set of feature plug-in modules;
    selecting a first plurality of feature plug-in modules from the set of feature plug-in modules;
    ordering the first plurality of feature plug-in modules, comprising:
        receiving classification information corresponding to the first plurality of feature plug-in modules, the classification information indicating a class for each feature plug-in module in the first plurality of feature plug-in modules,
        wherein at least two feature plug-in modules in the first plurality of feature plug-in modules are in the same class;
        receiving ordering attribute information corresponding to the first plurality of feature plug-in modules, the ordering attribute information indicating an attribute for each class it belongs to, wherein the attribute for each of the at least two feature plug-in modules in the first plurality of feature plug-in modules comprises one of global exclusive, top exclusive, bottom exclusive, class exclusive, and a weight factor; and
        ordering the first plurality of feature plug-in modules based on the classification information and the ordering attribute information; and
    applying the first plurality of feature plug-in modules to a first volume.

3. An apparatus for providing features in a logical volume management system, comprising:
    loading means for loading a set of feature plug-in modules;
    selection means for selecting a plurality of feature plug-in modules from the set of feature plug-in modules;
    ordering means for ordering the plurality of feature plug-in modules, wherein the ordering means comprises:

means far receiving classification information corresponding to the plurality of feature plug-in modules, the classification information indicating a class for each feature plug-in module in the plurality of feature plug-in modules, wherein the class for each of the feature plug-in modules in the plurality of feature plug-in modules comprises one of partition, volume, and aggregate; and means for ordering the plurality of feature plug-in modules based on the classification information; and application means for applying the plurality of feature plug-in modules to a volume.

4. An apparatus for providing features in a logical volume management system, comprising:

loading means for loading a set of feature plug-in modules;

selection means for selecting a plurality of feature plug-in modules from the set of feature plug-in modules;

ordering means for ordering the plurality of feature plug-in modules, wherein the ordering means comprises:

means for receiving classification information corresponding to the plurality of feature plug-in modules, the classification information indicating a class for each feature plug-in module in the plurality of feature plug-h modules, wherein at least two feature plug-in modules in the plurality of feature plug-in modules are in the same class;

means for receiving ordering attribute information corresponding to the plurality of feature plug-in modules, the ordering attribute information indicating an attribute for each class it belongs to, wherein the attribute for each of the at least two feature plug-in modules in the plurality of feature plug-in modules comprises one of global exclusive, top exclusive, bottom exclusive, class exclusive, and a weight factor; and means for ordering the plurality of feature plug-in modules based on the classification information and the ordering attribute information; and application means for applying the plurality of feature plug-in modules to a volume.

* * * * *